(12) United States Patent
Kot et al.

(10) Patent No.: US 10,779,059 B2
(45) Date of Patent: Sep. 15, 2020

(54) DISTRIBUTION OF A CONTENT ITEM AND MONITORING THE DISTRIBUTION USING WATERMARKING

(71) Applicant: Teletrax B.V., Eindhoven (NL)

(72) Inventors: Valery Stepanovich Kot, Eindhoven (NL); Mehmet Utku Celik, Eindhoven (NL); John Pierre Jacobus Verhagen, Eindhoven (NL)

(73) Assignee: TELETRAX B.V., Eindhoven (NL)

( * ) Notice: Subject to any disclaimer, the term of this patent is extended or adjusted under 35 U.S.C. 154(b) by 231 days.

(21) Appl. No.: 15/102,733

(22) PCT Filed: Dec. 10, 2013

(86) PCT No.: PCT/NL2013/050887
§ 371 (c)(1),
(2) Date: Jun. 8, 2016

(87) PCT Pub. No.: WO2015/088328
PCT Pub. Date: Jun. 18, 2015

(65) Prior Publication Data
US 2016/0316279 A1 Oct. 27, 2016

(51) Int. Cl.
*H04L 29/06* (2006.01)
*H04N 21/8358* (2011.01)
(Continued)

(52) U.S. Cl.
CPC ..... *H04N 21/8358* (2013.01); *H04N 21/2541* (2013.01); *H04N 21/8456* (2013.01)

(58) Field of Classification Search
None
See application file for complete search history.

(56) References Cited

U.S. PATENT DOCUMENTS 6,804,374 B1 * 10/2004 Beattie ................ G06T 1/005
382/100
7,515,733 B2 * 4/2009 Rhoads ............ G06F 17/30876
382/100
(Continued)

FOREIGN PATENT DOCUMENTS

WO  WO 2009/087511   7/2009
WO  WO 2011/062740   5/2011

OTHER PUBLICATIONS

International Search Report dated Mar. 28, 2014 for International Application No. PCT/NL2013/050887.

*Primary Examiner* — Nasser M Goodarzi
*Assistant Examiner* — Terrika Peterson
(74) *Attorney, Agent, or Firm* — Hamre, Schumann, Mueller & Larson, P.C.

(57) ABSTRACT

A method of and system for distributing a content item, having a plurality of segments. A composite content item is created by concatenating segments from different content items from different agencies. A segment of the composite content item may or may not already comprise a previously embedded segment watermark carrying a previously embedded segment payload. The method comprises determining if the segment already comprises a previously embedded segment watermark, and if so, logging the previously embedded segment payload in a watermark transaction log associated with the new segment payload; otherwise, embedding the new segment payload as a watermark in the segment. In the case that the segment already comprises a previously embedded segment payload, the previously embedded payload is logged in a watermark transaction log, and the previously embedded segment payload is replaced with a new segment watermark that represents the new segment
(Continued)

payload. A method and system for monitoring the distribution of a content item using a transaction log.

6 Claims, 7 Drawing Sheets

(51) Int. Cl.
*H04N 21/845* (2011.01)
*H04N 21/254* (2011.01)
*H04L 9/00* (2006.01)

(56) References Cited

U.S. PATENT DOCUMENTS

| | | | | |
|---|---|---|---|---|
| 8,036,419 | B2* | 10/2011 | Rhoads | G06T 1/0028 |
| | | | | 382/100 |
| 9,270,515 | B1* | 2/2016 | Postelnicu | G11B 27/00 |
| 9,805,436 | B2* | 10/2017 | Maas | H04N 21/8358 |
| 2002/0124024 | A1* | 9/2002 | Patterson | G01C 11/00 |
| | | | | 715/202 |
| 2003/0112974 | A1* | 6/2003 | Levy | G06T 1/0071 |
| | | | | 380/210 |
| 2003/0120946 | A1* | 6/2003 | Epstein | G06T 1/0021 |
| | | | | 726/21 |
| 2003/0131243 | A1* | 7/2003 | Pelly | H04N 1/32154 |
| | | | | 713/176 |
| 2004/0005055 | A1* | 1/2004 | Master | G06T 1/0021 |
| | | | | 380/205 |
| 2004/0260930 | A1* | 12/2004 | Malik | G06F 21/10 |
| | | | | 713/176 |
| 2005/0135614 | A1* | 6/2005 | Hollar | H04L 12/40104 |
| | | | | 380/201 |
| 2007/0011458 | A1* | 1/2007 | Moskowitz | G06T 1/0028 |
| | | | | 713/176 |
| 2009/0070587 | A1* | 3/2009 | Srinivasan | G10L 19/018 |
| | | | | 713/176 |
| 2009/0144818 | A1* | 6/2009 | Kumar | H04L 63/0272 |
| | | | | 726/13 |
| 2012/0308071 | A1* | 12/2012 | Ramsdell | H04N 1/32144 |
| | | | | 382/100 |
| 2013/0227293 | A1* | 8/2013 | Leddy | H04L 9/32 |
| | | | | 713/176 |
| 2014/0259086 | A1* | 9/2014 | Wajs | H04N 21/23439 |
| | | | | 725/116 |
| 2014/0270340 | A1* | 9/2014 | Maas | H04N 21/8358 |
| | | | | 382/100 |
| 2015/0089020 | A1* | 3/2015 | Altman | H04N 21/2547 |
| | | | | 709/217 |
| 2016/0301988 | A1* | 10/2016 | McMillan | H04N 21/8352 |
| 2017/0236240 | A1* | 8/2017 | Maas | H04N 21/8358 |
| | | | | 382/100 |
| 2018/0332323 | A1* | 11/2018 | Fischer | |

* cited by examiner

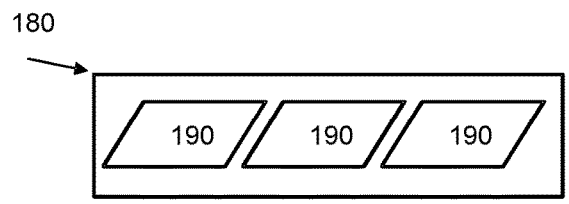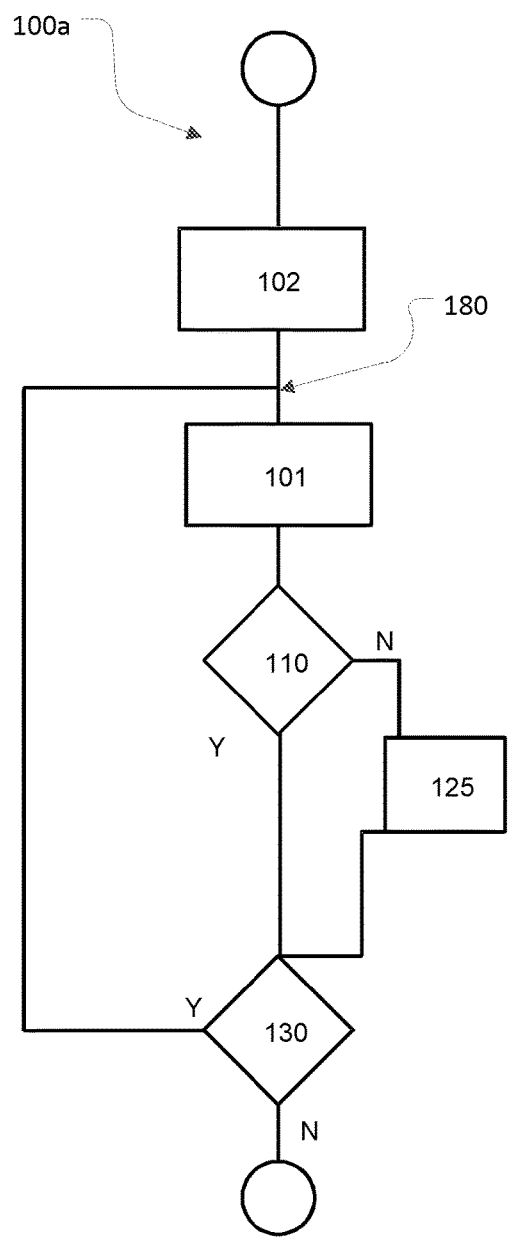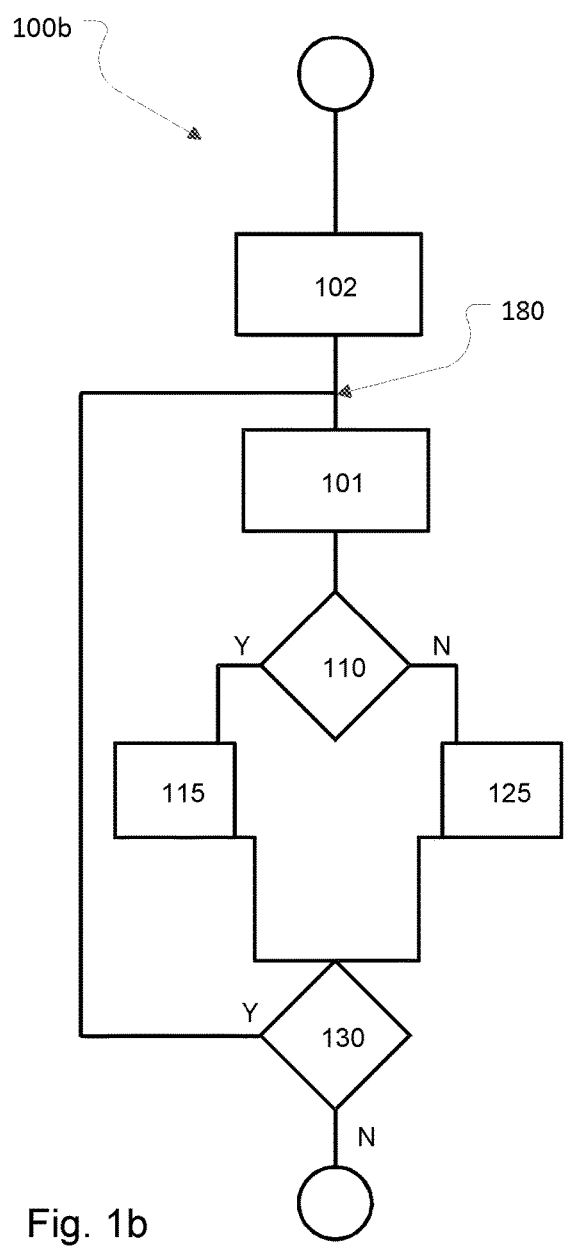
Fig. 1a
State of the art
Fig. 1b

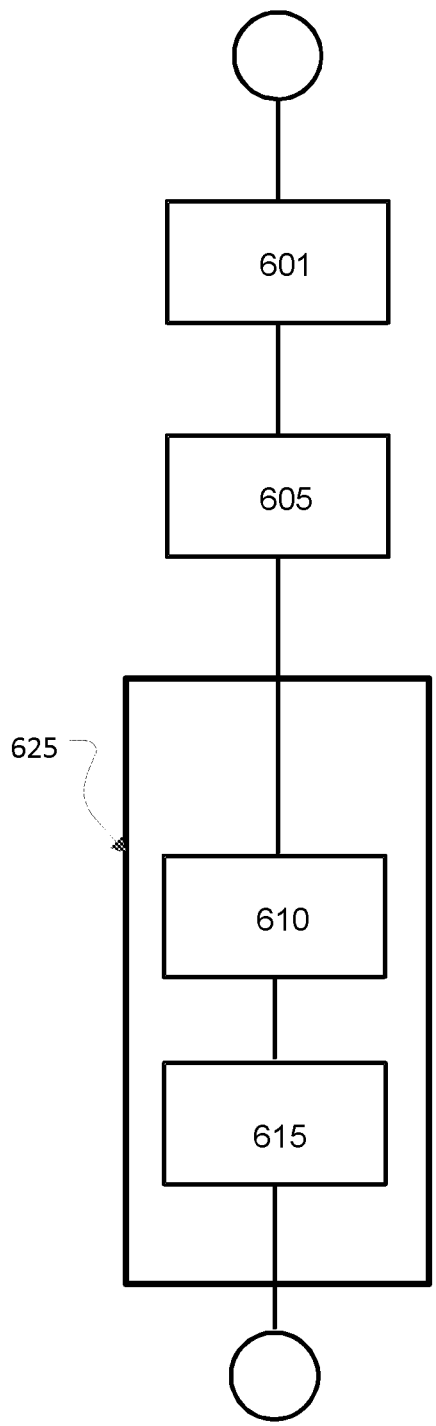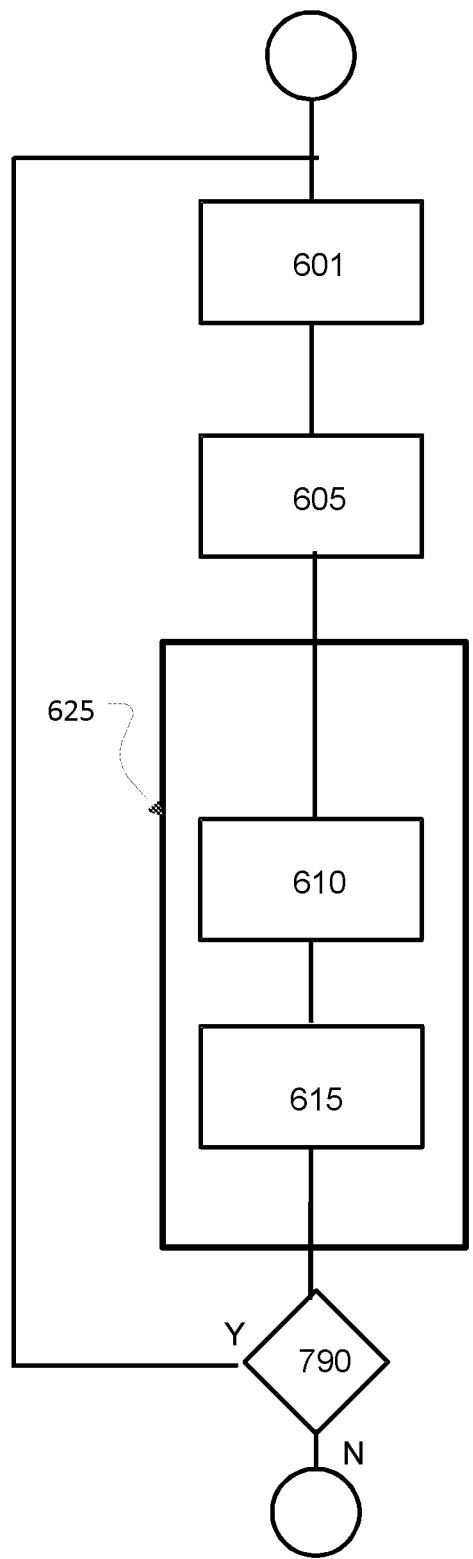
Fig. 6
Fig. 7

DISTRIBUTION OF A CONTENT ITEM AND MONITORING THE DISTRIBUTION USING WATERMARKING

FIELD OF THE INVENTION

The invention relates to a method of and system for distributing a content item. The invention further relates to a method and system of monitoring the distribution of a content item.

BACKGROUND OF THE INVENTION

Watermarking is an effective tool for tracing the source and distribution path of content items, such as movies, pictures, songs, radio and television, which could be made available in streams or downloadable form. One application of watermarking is distribution monitoring where distributed, broadcast material is constantly monitored for the presence of watermarks. When a watermark is found in a segment, the watermark or an identifier embedded therein links the segment to a source and a program. This enables an agency which performs the task of monitoring distribution of content to verify the distribution of content items generated by various agencies involved in the process of distribution and check whether each agency has fulfilled its obligations in the process of distribution.

A distribution monitoring agency may operate the watermark detectors to generate reports for its customers who have inserted their unique identifiers using watermarking. While such a watermark detection process can be done on multiple locations to cover local stations, monitoring report generation is often done from a central place. It is also possible that some information that links the segments' meta-data to unique identifiers used for watermarking is send by the customers to the service provider to be included in their reports. (These monitoring reports also incorporate meta-data from other sources such as programming information from EPG.)

Managing the various watermarks can be a challenging task. In a typical distribution chain, multiple parties are involved with the generation, editing (mixing) and distribution and broadcast of the content. Each of these parties may want to insert its own watermarks, to allow monitoring of the distribution of its content. As a result, content segments may comprise watermarks from multiple parties.

For example, consider a scenario where a news agency A makes a recording of a news event. Unedited footage is distributed to many news agencies. A news agency B1 takes one or more segments out of agency A's recording and edits it into a composite content item together with segments from a news story that agency B1 itself prepared. This composite content item, the edited news story is then distributed to many broadcast networks. Similarly, another news agency B2 takes the same segment from A's recording and creates its own news story. Finally, a television broadcaster C takes the news story from B1 and/or B2 and broadcasts it in its program flow. Agency A may want to monitor whether agencies B1 and/or B2 have distributed content obtained from A. At the same time agencies B1 and B2 may want to whether a broadcasting agency C has distributed the content from B1 and B2 respectively by broadcasting it. An agency D hired by B1 and/or B2 may be involved in monitoring the content broadcast by C and verify whether B1's content was correctly distributed, i.e. verify whether all content item segments have been distributed or broadcast To keep track of the relevant segments from the various parties, i.e. monitor broadcast content for segments from the news agencies A, B1, B2, it is known to have each agency insert its own watermarks in each segment, that can be coupled to the agency in question. For example, agency A may insert a watermark with a payload that contains A's name in every segment. Agencies B1's and B2's news stories would then contain a segment with that payload, allowing agency A to track the use of that segment (and in turn to for example invoice B1 and B2 for the use). Similarly, agencies B1 and B2 would insert their own watermarks in their news stories, for example an identifier of the story and the station, or an identifier and a timestamp.

The broadcast content can be monitored by receiving the broadcast content and detecting watermarks in the segments constituting the content. The watermark inserted by agencies B1 and/or B2 would then be detected when broadcaster C broadcasts that news story and the broadcast news story is received and monitored. Broadcaster C may in turn itself watermark its broadcasts to e.g. allow detection of unauthorized retransmissions by its subscribers.

A consequence of this approach is that certain segments of the content contain multiple watermarks. The segments taken from agency A's content by agencies B1 and B2 that end up in C's broadcast may contain three watermarks: A's original identification, B1 and/or B2's story and station identification and C's own identification to detect retransmissions.

It is well-known that adding multiple watermarks to a segment of content is undesirable, as this often leads to visible or audible distortions or a conflict where the addition of a new watermark corrupts a previously embedded watermark. Monitoring of broadcasts thus becomes unreliable, since corrupted watermarks can no longer be detected.

One may of course control the embedding process by reducing watermark strength to ensure that multiple watermarks can be accommodated, but then each watermark will be of significantly reduced strength compared to what would be possible. In this case, the robustness (detectability) of the watermarks will degrade as there is less watermark signal to be detected. In addition, this increases the chances that an attacker may remove one or more of the watermarks. Moreover, multiple watermarks often impede the detection of each other due to interference.

Therefore, multiple watermarks are not used in many practical systems. Instead, each party or agency embedding watermarks can detect the presence of another watermark in a content segment and temporarily pause the embedding of the watermark. This however has the disadvantage that the monitoring of broadcasts becomes unreliable due to pauses in the embedding of watermarks.

SUMMARY OF THE INVENTION

It is an object of the invention to reduce the need for multiple watermarks in a single segment in a content stream with content from different parties.

This object is achieved by a method of distributing media content comprising a plurality of content items. The method comprises providing at least one first content item from a first source, each first content item comprising at least one first segment, providing a second content item from a second source, the second content item comprising at least one second segment, the at least one second segment having a first, previously embedded watermark embedded therein, and combining first segments of the at least one first content item and second segments of the second content item into a composite content item. Thus a new composite content item is created having segments from different origin. Subsequently, the method comprises embedding a new second segment watermarking the composite content item and sending the watermarked composite content item to a broadcaster for distribution. The embedding comprises determining for each segment of the composite content item of a presence of the first, previously embedded segment watermark, wherein in dependence of the presence of the first, previously embedded watermark the embedding of the new second segment watermark in the composite content item is controlled by logging a combination of the first, previously embedded watermark with the new second segment watermarking a watermark transaction log.

The transaction log can be provided to a distribution monitoring agency for monitoring the distribution. The monitoring agency is now enabled to verify whether all segments of the composite content item is distributed, since the new watermark and payload of the segment where it was not embedded can be retrieved from the transaction log.

The controlling of the embedding of a second segment watermark in the composite content item comprises inhibiting the embedding of second segment watermark in the composite content item. This prevents a new watermark to be embedded in a segment where already a watermark is present In an embodiment, the previously embedded segment and new segment watermarks have different respective payloads. The combination of the different respective payloads are logged into the transaction log.

In an embodiment, the previously embedded and new segment watermarks can originate from the same watermark, i.e. pseudo random code embedded or to be embedded into the respective content having different payloads. Likewise the previously embedded and new payload can originate from the same watermarking technology with different respective payloads. By recording the existing, previously embedded payload in a log file, and associating that with the new payload (that was supposed to be watermarked into this segment) the same result is achieved: the segment can be tracked from a third-party transmission by extracting the payload and using the transaction log to match the payload with the information recorded therein. Thus, the logging of the previously embedded segment payload in the watermark transaction log allows a determination of the relationship between the previously embedded segment payload and the new segment payload.

This method is preferably performed on plural segments of the content item, e.g. a stream or fixed-length item. The more items processed this way, the better the reduction. Note that the segment payloads of each of the plural segments may be mutually different. A different content payload may be embedded in each of the plural segments in the case that the segment does not already comprise a previously embedded segment watermark. For example, such payload may comprise a client identifier and a timestamp, which timestamp increases sequentially through the segments of the content item. The term 'different' here includes payloads that share a common prefix, for example an unchanging identifier of the content item or its originator or rights holder.

In an embodiment concerning the case that the segment of the composite content item already comprises a previously embedded segment watermark, the previously embedded payload is logged in a watermark transaction log, and the previously embedded segment watermark is replaced with a new segment watermark that represents the content payload. Rather than retaining the previously embedded watermark, now a new watermark is inserted as a replacement. The previously embedded watermark's payload is logged. This provides the same advantage as outlined above. The logged combination of the first, previously embedded watermark and payload can be logged in the transaction log.

In an embodiment the step of determining if the segment already comprises a previously embedded segment watermark is followed by a step of evaluating if the segment could accommodate a further watermark without substantially damaging the previously embedded segment watermark, and if so, executing the step of embedding the content payload. In some cases a segment watermark may already be present, but addition of another watermark would not perceptibly distort the segment. In such a case, one may opt to simply insert the new segment watermark rather than following the above approach.

In an embodiment, the controlling of the embedding of a second segment watermark in the composite content item further comprises determining a strength of the first segment watermark, controlling the embedding of the second segment watermark (B) in dependence of the strength of the first segment watermark (B). This allows to selectively embed the new second segment watermark in the same segment already provided with a first segment watermark.

In a further embodiment, the embedding of a second segment watermark in the composite content item is performed if the strength of the first segment watermark is more than a first threshold. This ensures that the first, previously embedded watermark is strong enough not to be corrupted by the new second segment watermark.

In a preferred embodiment of the invention, the embedding of the second segment watermark is performed with a second segment watermark payload according to a second segment payload pattern, and wherein the logging of a combination of the first segment watermark with the second segment watermark in a watermark transaction log comprises logging the first segment watermark with the second segment watermark payload according to said second segment payload pattern. The use of watermark payload allows identification of the source of the segment and time and date of creation and other features relevant for identifying the segment.

In a further embodiment, each second segment watermark payload comprises a client identifier and a timestamp, which timestamp increases sequentially through the segments of the content item. This allows the distribution of the segment in time.

In another preferred embodiment, a first and second segment watermark payload is determined. A combination of the first segment watermark payload with the second segment watermark payload is subsequently logged.

The object is also achieved in a system for distributing a media content item comprising plural segments. The system comprises an editor unit (503) arranged for concatenating at least one first content item from a first source, each first content item comprising at least one first segment and a second content item from a second source, the second content item comprising at least one second segment, the at least one second segment having a first, previously embedded segment watermark embedded therein, into a composite content item, an embedding unit arranged for embedding a new, second segment watermark in the composite content item, output means for sending the watermarked composite content item for distribution.

The system further comprises a determining module for determining for each segment of the composite content item a presence of the first segment watermark in the segment, a control module arranged for in dependence of the presence of the first segment watermark in the segment arranged further for controlling the embedding of the second segment watermark in the segment of the composite content item, the controlling of the embedding of a second segment watermark in the composite content item comprising inhibiting the embedding of the second segment watermark in the composite content item.

The system further comprises a logging module arranged for logging a combination of the first segment watermark with the second segment watermark in a watermark transaction log.

The invention further provides for a method of monitoring the distribution of a media content item comprising plural segments, each of the plural segments comprising a respective segment watermark representing a respective segment payload. The method comprises detecting in a segment of the content a segment watermark, extracting a segment payload from the segment watermark, locating an entry in a watermark transaction log that contains the segment payload associated with a further payload, and acquiring the further payload. In one embodiment, the identifier is obtained as a combination of the various elements of the entry from the transaction log, for example a concatenation of the segment payloads.

In an embodiment the step of detecting detects plural segment watermarks in plural respective segments, the step of extracting extracts respective segment payload from each segment watermark, the step of locating comprises identifying one or more entries that contain some or all of the extracted segment payloads, and the step of acquiring the identifier is based on the entry from the identified entries that has the relatively best match with the extracted payloads.

As typically plural segment watermarks are expected to be detected, an advantage is obtained by examining how well all entries match with the extracted payloads. For example, the entry with the most matching payloads may be chosen, or the entry with the most adjacent matching payloads can be used. As an alternative, if plural entries seem a good match, each of the plural entries may be used to obtain respective identifiers. Having plural identifiers is not necessarily a bad thing—those may be reported to different parties.

In a further embodiment the entry comprises the further watermark payload and an alternative payload and the step of acquiring comprises incorporating in the identifier the alternative payload in place of the further watermark payload. For example, one may return the concatenation of the recovered payloads but according to this embodiment one might also incorporate the alternative payload in the identifier instead of the extracted payload. This embodiment has the advantage that the identifier is in the expected format: the extracted payload originated with a different source and thus may differ in structure or form from the further payload given in the log, making it harder to process an identifier comprising the extracted payload.

The object is also achieved in a system for monitoring distribution of a content item comprising plural segments, each of the plural segments comprising a respective segment watermark representing a respective segment payload. The system comprises a detection module arranged for receiving the content item and detecting a segment watermark in a segment of the content item, an extraction module arranged for extracting a segment payload from the segment watermark and a logging module for logging the detected segment water in a monitoring log. The logging module comprises a locating module for locating an entry in a watermark transaction log that contains the segment payload combined with a further payload using the detected segment payload, and a retrieving module for retrieving the further payload. The logging module is further arranged for logging the further payload instead of the extracted payload.

BRIEF DESCRIPTION OF THE FIGURES

The invention will now be elaborated upon with reference to the figures, in which:

FIG. 1a schematically illustrates a method of embedding a new segment payload in a segment of a content item according to the state of the art.

FIG. 1b schematically illustrates a first embodiment of the method of the invention of embedding a new segment payload in a segment of a content item.

FIG. 6 illustrates a method in accordance with the invention of monitoring the distribution of a content item comprising plural segments.

FIG. 7 illustrates an extension of the method of FIG. 6.

Same reference numerals indicate same or similar features. Where a numeral is followed by a letter, e.g. 120a, 120b, this indicates that the feature is duplicated within the shown context, for example as two items operating in parallel.

DETAILED DESCRIPTION OF CERTAIN EMBODIMENTS

Figure 2:
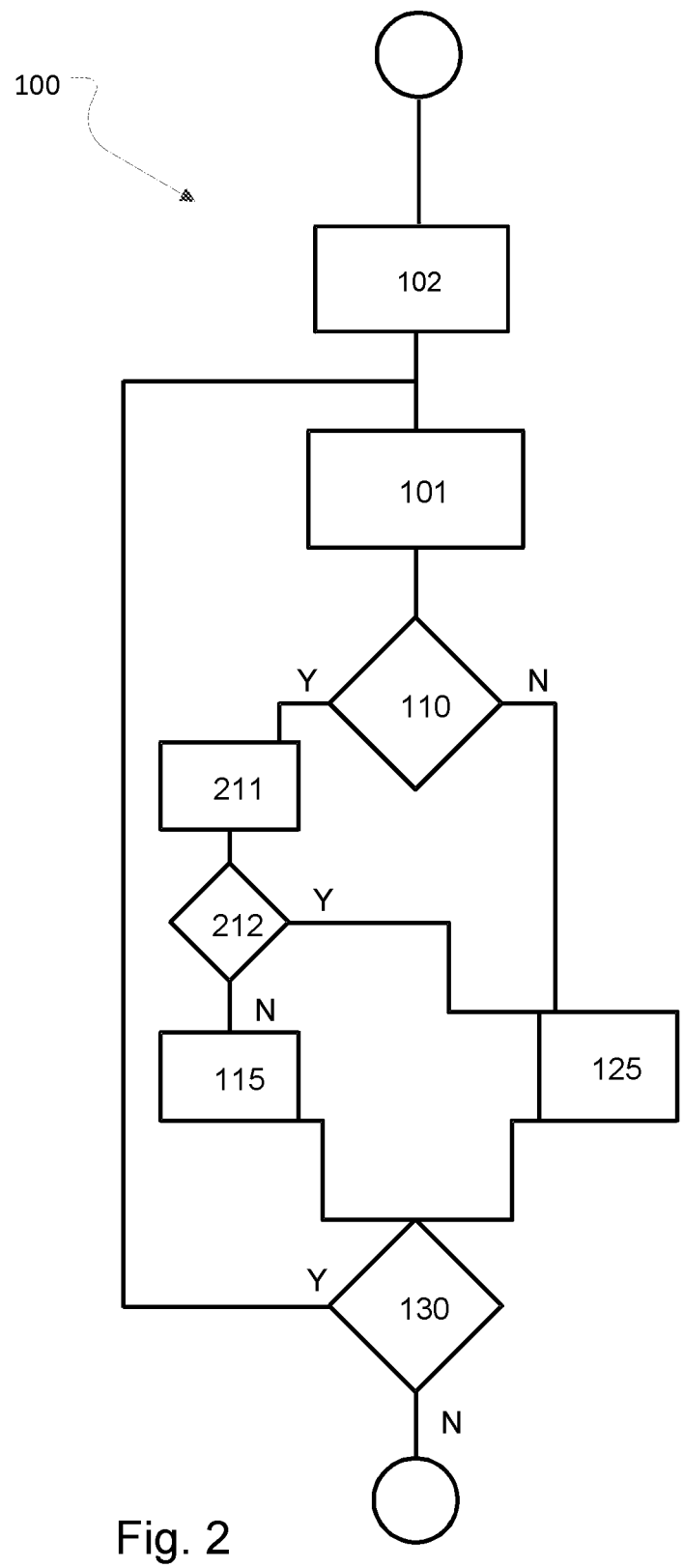
FIG. 2 illustrates a further embodiment of the method.

In FIG. 1a a method of distributing a content item according to the state of the art is described, wherein, an agency B wants to compose or edit a content item 180 by concatenating 102 segments from a content item created by or belonging to agency B with segments from a content item from another source or agency A. The segments from agency B do not have a watermark embedded therein. The segments from agency A contain a previously embedded segment watermark A such that after distribution of the composite content item 180 the use of segments from agency A can be monitored. The order in the concatenating 102 of the segments from agency A or agency B is arbitrary, depending fully on the content item 180 agency B wants to create. Each segment 190 in the composite content item 180 once created may or may not already comprise the previously embedded watermark A. After creation, the composite content item 180 is subsequently watermarked 125 by agency B with a watermark B before distribution, such that after the distribution the composite content item 180 can be monitored. The content items from agency A are available as electronic files and may be streamed to agency B or transferred by other electronic means. The content items of agencies A and B, as well as the composite content item 180 may be streamed or may be stored on disk or other electronic storage means and as such be transferred between agencies.

The watermarked composite content item 180, having all segments watermarked with watermark B, including segments from agency A already having a watermark A can be now distributed. This may result in segments of agency A having watermark A not being properly monitored, since watermark A is deteriorated by watermarking with B, or vice versa.

As shown in FIG. 1a, in step 101 the content item 180 is examined for segments 190 already comprising a previously embedded segment watermark A. Preferably this step 101 comprises attempting a detection of the previously embedded segment watermark A. This embodiment may require access to watermark detection keys or patterns corresponding to watermark A, as the presence of a watermark is not always detectable without such side information. Many watermarks are designed to be imperceptible and hence undetectable without the appropriate knowledge.

Alternatively one may access a watermark transaction log from agency A to determine if the segment comprises a previously embedded segment watermark A. Typically this involves using an identifier for the segment. This embodiment has the advantage of speed, but requires access to the transaction log which typically is only possible if the previously embedded watermark has been embedded by the same agency.

In step 110, if a previously embedded segment watermark is not found in the segment, the method proceeds to step 125, which is controlled such that watermark B is embedded when no watermark A is present. When a watermark A is present, the method proceeds to step 130. The watermark A is left in the segment, no watermark B is embedded.

In step 130 a check is made if more segments 190 are available for processing. If so, the method returns to step 101. The method could alternatively be employed for only a single segment, which means omitting step 130. Optionally, step 130 could be extended to make more advanced checks, for example if a sufficient number of segments 190 have been processed, and to end the method if that is the case.

After the embedding the watermarked content item can be distributed by sending the item to a distributor who may broadcast the content item, and/or sending the watermarked content item to recipients directly.

A payload can be any item of information that is to be carried in a watermark. A popular kind of payload is an identifier for the content item, relating to the originator, proprietor, and/or distributor of the content item, for example as an alphanumeric name or as symbolic string of characters that is translated to a name and/or other identifying information using an external translation table. If such a payload is extracted, the extracted payload can be used for example to identify at least one of the content item, proprietor and distributor. Thus the segments having watermark A from agency A may be provided with a payload A1, . . . , An for respective segments 1-$n$. Also the segments having watermark B may be provided with payload B1, . . . , Bm for respective segments 1-$m$.

The payload does not have to be the same in all segments; the segment payloads of each of the plural segments 190 may and preferably are mutually different. For example the payloads may comprise segment identifiers that increase sequentially from one segment to the next. The payloads may also comprise time codes, for example relative to the first segment to allow a detection of where relatively speaking in the content 180 the segment occurs. The time codes may also be absolute and thus allow identification of the time that the segment was distributed, for example its original broadcast time.

A payload may also be a combination of static and changing information. For example, an unchanging identifier of the content 180 and/or its originator or rights holder may be combined with a segment-specific identifier such as a time code. This allows for each segment the identification of the content 180, originator or rights holder (or the like) and the segment-specific information such as its position in the content 180 or its time of distribution.

FIG. 1b shows a system for distribution of a content item according to the invention. In FIG. 1b it is shown that according to an embodiment of the invention, in step 115, the previously embedded segment watermark A is logged together with the new segment watermark B, wherein A and B may have a payload respectively, in a watermark transaction log. The content and form of the log is elaborated upon in FIG. 4. If no segment watermark was found in the segment in step 101, then in step 125 the new segment payload Bj is embedded as a watermark in the corresponding current segment 190$j$. The new segment payload Bj is preferably also logged in the log.

FIG. 2 illustrates a further embodiment of the method of FIG. 1b. The steps of this embodiment are the same as in FIG. 1b, except that step 115 of logging is preceded by steps 211 and 212.

The method arrives at step 211 if in step 110 the segment has been determined to contain a previously embedded watermark A. In step 211 the segment is evaluated to determine if the segment could accommodate a further watermark B without substantially damaging the previously embedded segment watermark A. This can be performed by in step 211 by determining a strength of the watermark A in the current segment 190$j$. In step 212 the determined strength of watermark A can be compared with a threshold. If the evaluation is in step 212 found to be positive, i.e. the strength of watermark A exceeds the threshold, then the new segment watermark B can be embedded and thus the method proceeds to step 125 where the new segment payload Bj is embedded. If the evaluation in step 212 is found to be negative, i.e. the strength of watermark A does not exceed the threshold, then the method proceeds to step 115 as described above.

Figures 3, 4:
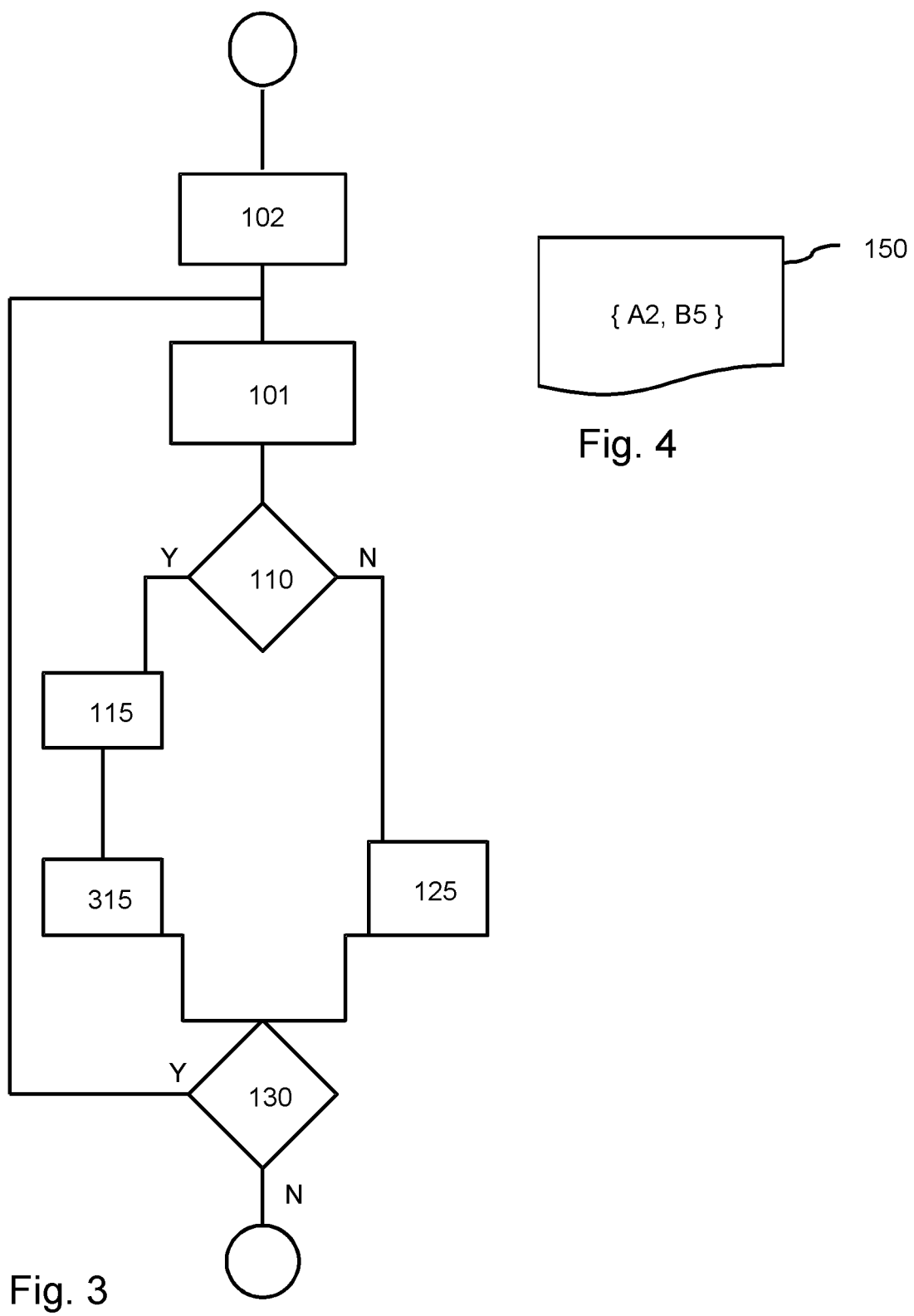
FIG. 3 illustrates a yet further embodiment of the method.
FIGS. 4, 4a, 4b and 4c schematically illustrate examples of a watermark transaction log as contemplated for use by the present invention.

FIG. 3 illustrates a yet further embodiment of the method. The steps of this embodiment are the same as in FIG. 1b, except that after step 115 of logging step 315 occurs. The embodiment of FIG. 3 may be combined with the embodiment of FIG. 2 by having steps 211 and 212 precede step 115.

The method arrives at step 115 if in step 110 the segment j has been determined to contain a previously embedded watermark. In step 115 the previously embedded payload is logged in the watermark transaction log. Next, in step 315 the previously embedded segment watermark A is removed and replaced with a new segment watermark B that represents the new corresponding segment payload Bj. This embodiment may require access to watermark detection keys or patterns, as otherwise the removal or replacement of the previously embedded watermark A may be difficult. After replacement, the method proceeds to step 130 as above.

FIGS. 4, 4a, 4b and 4c schematically illustrate examples of a watermark transaction log 150 as contemplated for use by the present invention. In these examples, agency B creates a composite content item 180 (see also FIG. 1b) comprising 6 segments 190 (see also FIG. 1b) wherein the first 4 segments 190 are taken from one or more content items by agency B itself. The $5^{th}$ segment 190 however is the $2^{nd}$ segment taken from a content item obtained by agency B from another agency A, whereas the $6^{th}$ segment is taken from the content item by the agency B. The content item from agency A is already provided with watermark A having respective payloads A1-A6 in the corresponding segments. While embedding B's watermark and respective payloads in the composite content item, where B5 should be embedded as the new watermark, A2 is detected as previously embedded watermark and payload. Thus B5 is not embedded, and the combination of A2 and B5 is logged into a transaction log 150. This transaction log 150 can be used during the monitoring of the distribution of the composite content item 180 as will be discussed below.

The transaction log 150 can be an electronic file which is designed for storing watermark payload combinations as described. The transaction log 150 can be maintained at the site of agency B and forwarded to a monitoring agency which uses the recorded combinations while monitoring the distribution of agency B's content to retrieve the segment payloads which were not embedded in the composite content item to be distributed. The transaction log 150 can also be a common transaction where the distribution is logged for various composite content items from various respective agencies.

In the example of FIG. 4 a transaction log 150 is shown wherein an explicit combination is recorded: a separate entry {A2, B5} which allows a later monitoring process to recover the combination.

Figure 4A:
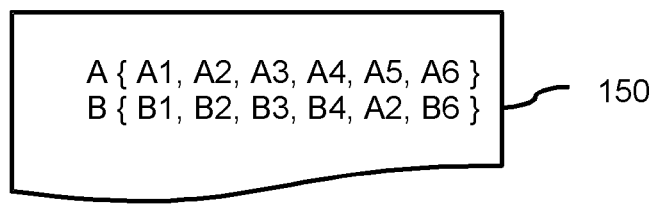

The log 150 of FIG. 4A shows two entries, regarding two content items that were processed according to the invention. As shown, the log 150 records for each segment where the step of logging 115 has occurred a record that associates the existing payload and the new payload. For segments where step 125 has been taken, the payload of the new segment watermark is logged.

Content item A comprises six segments, each with a respective segment watermark that provides a payload denoted as An for segment n. For instance, content A may be a recording of a news event released by a news agency. The segment payload An indicates in this example the origin, e.g. as an identifier of the agency, and a sequence number that relates to the segment of the content A. Thus, if one encounters a content fragment that contains payload A3, one knows this is segment 3 from the content A released by this agency.

Continuing with the example, a news broadcasting agency B may use a segment from agency A's content, say segment A2, in its evening news show. The agency B uses watermarks in the same way, and applies the method of the invention to its news show, content item B. For all segments except the fifth, the segment payload would be Bn, i.e. the identifier of B and a sequence number. However, when following the method of the invention, an existing watermark would be detected in the fifth segment of B's content, namely with payload A2.

Now the invention provides that an association is logged between the intended payload B5 and the existing payload A2. In the embodiment of FIG. 4a, the association is provided by simply logging payload A2 where B5 should have occurred. The context of the log entry provides sufficient information.

Figure 4B:
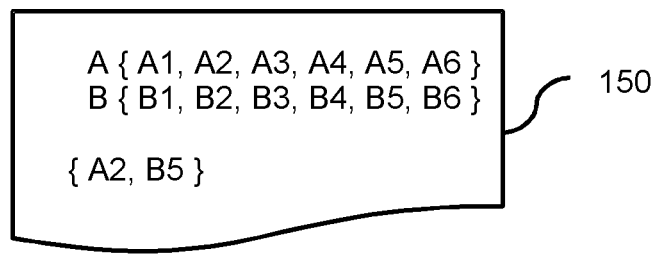

In FIG. 4b an alternative embodiment of the log 150 is provided where an explicit association is recorded: a separate record records {A2, B5} which allows a later detection process to recover the association. The log for content B now records payload B5 as usual, but the separate record allows the association to be recovered.

Figure 4C:
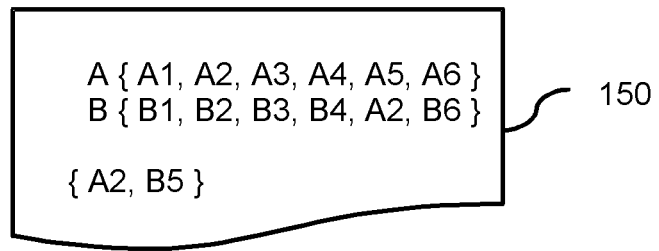

FIG. 4c shows yet another alternative embodiment of the log 150 with an explicit association. Here, the log for content item B records payload A2 as in FIG. 4A, but a separate record records {A2, B5} which allows a later detection process to recover the association. This embodiment is advantageous where the payload B5 cannot be reconstructed solely from context, for example where a specific identifier of the fifth segment is used that is unrelated to the identifiers for the previous and next segments.

Figure 5A:
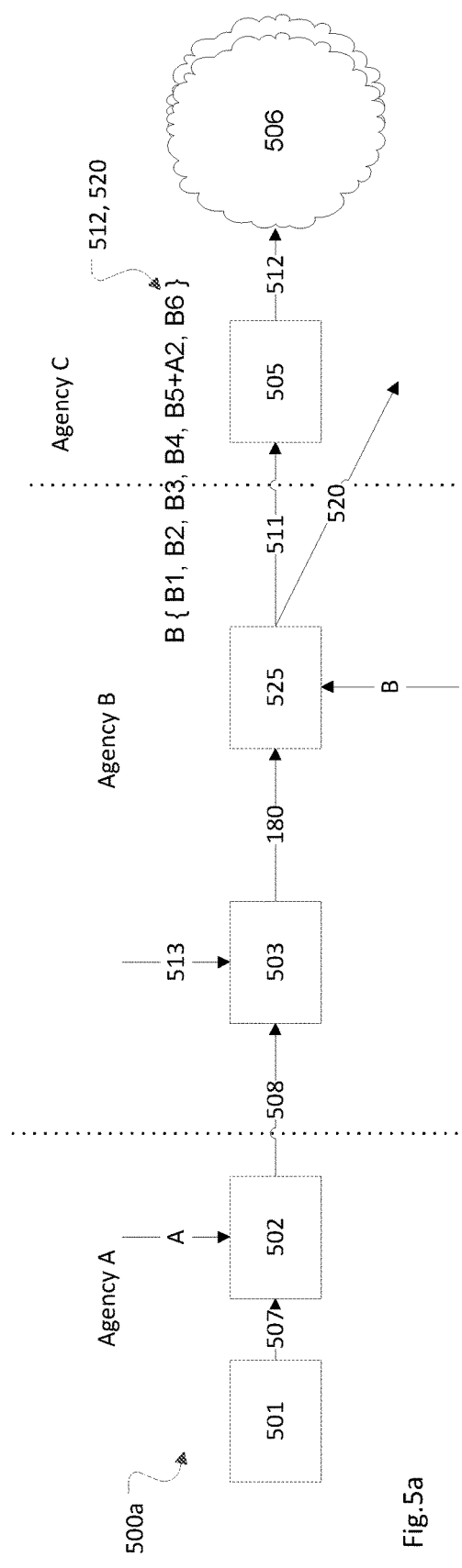
FIG. 5a schematically shows a system in accordance with the state of the art.

FIG. 5a shows a system 500a for distributing media content according to the state of the art in accordance with FIG. 1 a. A content editor 501 at agency A provides a content item 507 having content item segments. A watermarking unit 502 uses a watermark A to watermark the segments of content item 507 and can embed the watermark using payloads such that subsequent segments contain payloads A1, ..., An.

The watermarked content item 508 from agency A is provided to agency B who takes segments from this content item 508 and concatenates these under operator control, using an editor unit 503, with segments from one or more content items 513 provided at agency B. The resulting composite content item 180 is subsequently watermarked in a watermark embedder module 525 with agency B's watermark B with payloads B1, ..., Bn, so that the distribution by a broadcasting unit 505 at broadcasting agency C of a distributed version 512, 520 of the composite content item can be monitored. The broadcasting unit 505 can be a TV station transmitter or an Internet router so that the content is distributed via a network 506 such as the internet. The content may of course also be linked directly 520 to users. Following the example described above, according to the state of the art in the $5^{th}$ segment from agency A, the same segment may have both watermark and payloads A2 and B5 embedded therein.

Figure 5B:
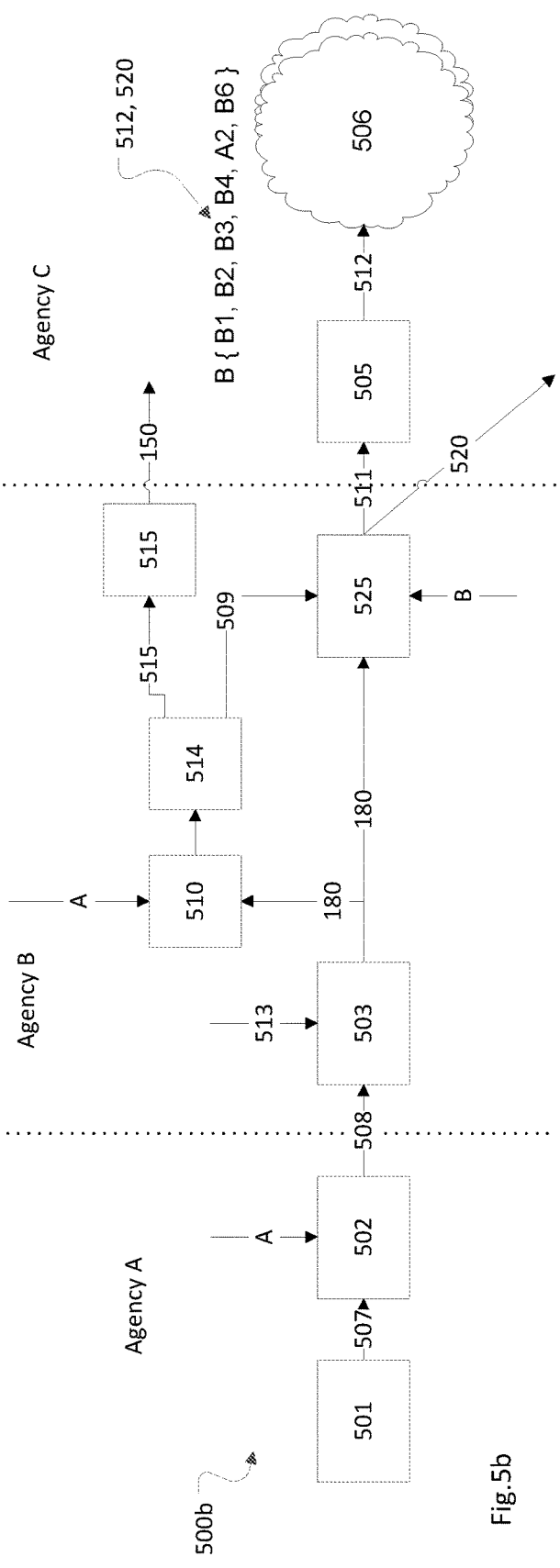
FIG. 5b schematically shows a system in accordance with the present invention.

FIG. 5b schematically shows a system 500b for distributing a content item in accordance with the present invention. The system 500b comprises various modules that together execute the method of FIG. 1b. To this end, the system 500 comprises the modules and layout of system 500a. The system 500b further comprises a determining module 510 for determining if a segment in the composite content item 180 already comprises a previously embedded segment watermark, as per step 101. The determining module 510 is coupled control module 514 which controls, as in step 110, a logging module 515 and embedding module 525, which perform steps 115 and 125 respectively. The control module 514 controls the embedding module 525 by inhibiting the embedding of a new watermark in a segment when a previously embedded watermark and payload is detected by the determining module 510 in the segment. Following the example described above, according to the invention, the $5^{th}$ segment from agency A, only has the watermark and payload A2 embedded therein. The logging module 515 is simultaneously controlled by enabling it to make an entry in the transaction log 150 of a combination of the previously embedded watermark and payload and the new watermark and payload that the embedding module 525 was about to embed, but was inhibited to do so.

Alternative to logging both the previously embedded watermark and payload and the new watermark and payload, the logging module 515 logs the watermark and payload embedded in each segment in the transaction log 150. So where no watermark was present, the new watermark is logged. And where a previously embedded watermark was present, this previously embedded watermark is logged. This allows a distribution monitoring log wherein the distributed watermarks and payloads are logged, to be verified against the transaction log 150.

FIG. 6 illustrates a method in accordance with the invention of monitoring the distribution of a content item. The content item comprises plural segments, each of the plural segments comprising a respective segment watermark representing a respective segment payload. The method of monitoring the distribution of a content item complements the method of FIG. 1*b* of distributing a content item. This method may be executed as a sequel to the method of FIG. 1*b*, or be executed separately. In step 601 the content item is received and a segment of the content item is analyzed in an attempt to detect a segment watermark therein. A watermark detector used for this purpose can advantageously use the known watermarks A and B to detect the respective watermarks and their respective payloads in the segments of the content item to be monitored. If the detection is successful, then in step 605 a segment payload is extracted. The watermark segment payload is logged in the next step 625 in a monitoring log. While logging, in step 610 an entry in the watermark transaction log 150 is located that contains the segment payload associated with a further payload. If present, the further payload is retrieved in step 615. The further payload is then used create an entry in the monitoring log instead of the extracted payload. This way a monitoring log is created wherein the segment payloads which were originally embedded in the composite content item 18, including the watermark payload of the segment wherein the previously embedded watermark and segment payload were maintained.

In the example where the composite content item 180 contains payloads B1. B2, B3, B4, A2, B6, now using the transaction log 150, a monitoring log can be created having payloads B1, B2, B3, B4, B5, B6 as would normally be expected when monitoring a distribution of a content item.

As discussed above with reference to FIGS. 4, 4*a*, 4*b* and 4*c*, various embodiments of the log 150 may be employed.

In the case of FIG. 4, when monitoring a distributed content item of agency B the segment having watermark payload A2 is encountered, it can be established by searching the transaction log 150 for A2 and finding the combination {A2, B5}. From finding this combination, it can be concluded that B5 was to be inserted in the respective segment of the composite content item. While monitoring content from agency B it can be established that payload B5 was to appear. Thus it can be concluded that all of agency B's composite content item, i.e. segments B1-B6, was distributed.

Assume that in step 605 the segment payload of A2 is extracted. In case the log follows FIGS. 4 and 4*a*, then the location of A2 in the log will result in segment identifiers for segments of content items from both agencies A and B being located. The content of other segment payloads is necessary to make an unambiguous identification of whether the content item being examined is A or B or a part thereof. This is discussed below with FIG. 7. When making such an identification, the payloads for segments from both agencies A and B may be acquired. This is often sufficient, as the segment A2 was present in segments from both A and B thus a monitoring report to both these originators is appropriate.

In case the log follows FIG. 4*b* or 4*c*, then the extra record that provides {A2, B5} results in step 610 having the information that segment payload A2 is associated with another payload, B5. With this information the acquisition step 615 can replace B5 in the log entry for B with A2 and consult the log 150 to see if a good match occurs. Should multiple segment payloads be obtained, the identifier will typically comprise a combination of the segment payloads. For example the identifier may comprise {B1, B2, B3} if the content item being examined contained these three payloads. In case one of the segments comprises the segment with payload A2, then the identifier may replace this previously embedded segment payload with segment payload B5 and thus identifier {B4, B5, B6} is acquired even though payload B5 was not actually present in the content. This has the advantage that the identifier is in the expected format: payload A2 may differ in structure or form from payload B5, making it harder to process an identifier comprising {B4, A2, B6}.

In case the log 150 follows the embodiment of FIG. 4*c*, the entry for B contains A2 to allow for a more specific detection, as the entry now matches the payloads that are actually present in the content. The extra record provides for the mapping of the extracted payload A2 to the intended payload B5.

FIG. 7 illustrates an extension of the method of FIG. 6 in which plural segment watermarks in plural respective segments are processed. The steps 601, 605 610 and 615 are taken as in FIG. 6. In step 790 a determination is made if more segments are to be processed. If so, the method returns to step 601. Now, in step 601 plural segments are analyzed. In step 605 plural segment payloads are extracted. Step 610 now comprises identifying one or more entries that contain some or all of the extracted segment payloads. In step 615 the monitoring of the distribution of the content is based on the entry from the plural identified entries that has the relatively best match with the extracted payloads. In an embodiment a majority voting algorithm is used to determine this best match. Alternative determinations are of course also possible.

Figure 8A:
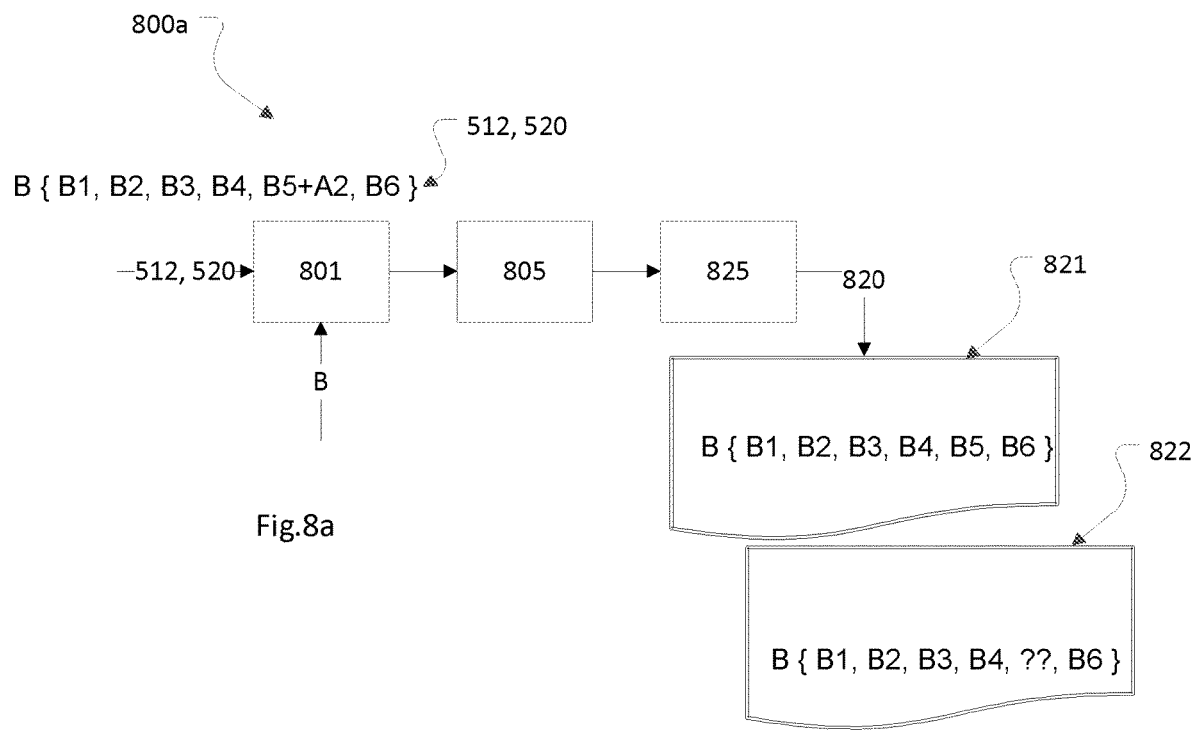
FIG. 8a schematically shows a system for monitoring distribution of a content item according to the state of the art.

FIG. 8*a* schematically shows a system 800*a* for monitoring distributing a content item. A distributed content item 512, 520 according to the state of the art is received for monitoring at a detection module 801 corresponding to step 601 in FIG. 6, which detects watermarks embedded in the content item 512, 520. Extraction module 805 corresponding to step 605 of FIG. 6 extracts the detected segment watermark payload. A logging module 825 logs the watermark payloads in a monitoring log 821, 822. Thus the monitoring log 821, 822 has the watermarks or watermark payloads of the respective segments in the distributed content item 512, 520. In the above described example, the distributed content item 512, 520 according to the state of the art may contain both watermarks with payloads A2 and B5 respectively in the 5$^{th}$ same segment. As a consequence detection may be ambiguous, resulting in either a correct monitoring log 821 or in a faulty monitoring log 822.

Figure 8B:
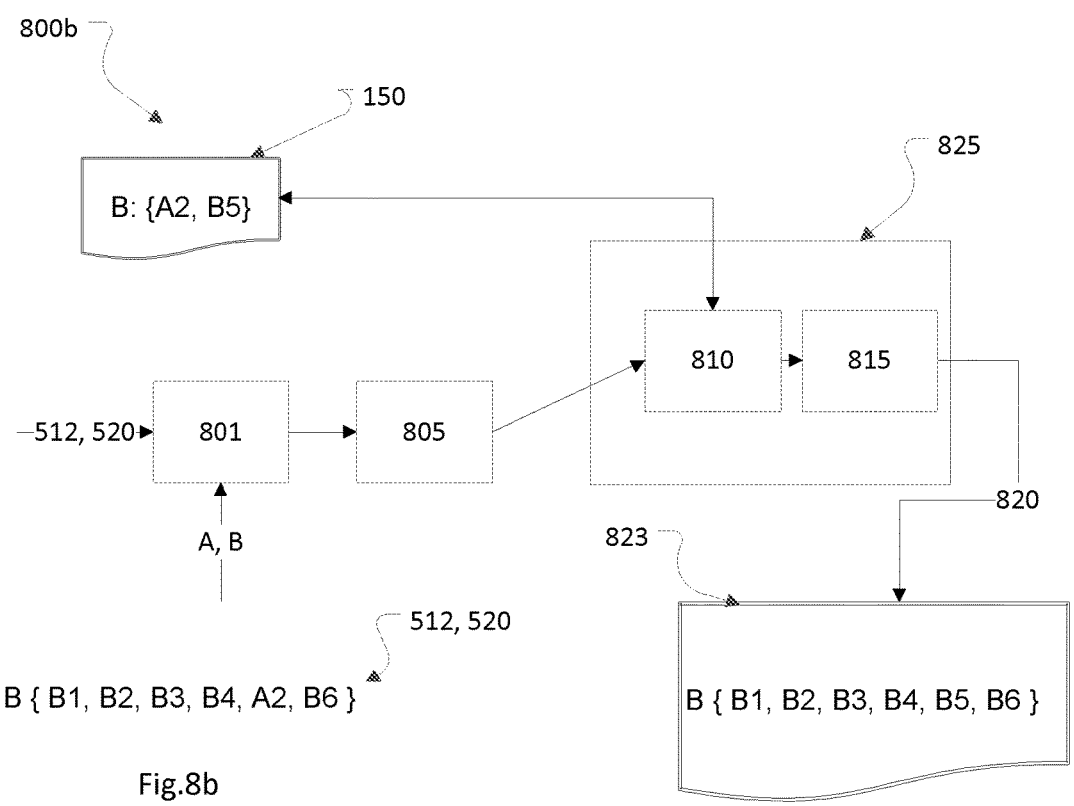
FIG. 8b schematically shows a system for monitoring distribution of a content item in accordance with the present invention.

FIG. 8*b* schematically shows a system 800*b* for monitoring the distribution of content in accordance with the present invention. The system 800*b* comprises the modules as described in relation to FIG. 8*a*, and additional modules 810 and 815 that together execute the method of FIG. 6. To this end, the system comprises a detection module 801 that corresponds to step 601 for detecting in a segment of the content a segment watermark, an extraction module 805 corresponding to step 605 for extracting a segment payload from the segment watermark. The system further has a logging module for creating a monitoring log 823.

The logging module 825 has a locating module 810 corresponding to step 610 for locating an entry in watermark transaction log 150 received from the system 800*b* for distributing a content item according to the invention, that contains the segment payload associated with a further payload, and a retrieving module 815 for retrieving the identifier based on the further payload. Following the example described above, the content item to be monitored 512, 520 has in the 5$^{th}$ segment only watermark and payload A2. Using the acquisition module a correct monitoring log 823 can be created using the retrieved identifier for the watermark and payload B5 which was associated with A2, indicating the 5$^{th}$ segment of the composite content item 180. As a result, the monitoring log 823 shows the payloads B1-B6 identifying the segments of the composite content item 180 which were distributed for agency B.

Advantageously the monitoring system may also determine which segments from another agency were used, in this example agency A. Using the transaction log 150, where A2 was found in the distributed content item 512, 520, it can be established that A2 was legitimately distributed by agency B, since the combination of A2 and B5 was logged in the transaction log 150.

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

The invention is preferably implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Machine-readable storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. To this end one may connect a server system comprising the storage medium discussed above to a network, and arrange this server for allowing the instructions to be downloaded to client systems connected directly or indirectly to the network.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A method of distributing media content comprising a plurality of content items, the method comprising:
   providing at least one first content item from a first source, each first content item comprising at least one first segment;
   providing a second content item from another source, being a second source, the second content item comprising at least one second segment, the at least one second segment having a first segment watermark embedded therein;
   concatenating first segments of the at least one first content item and second segments of the second content item into a composite content item;
   embedding a second segment watermark in the composite content item,
   sending the watermarked composite content item for distribution;
   wherein the embedding a second segment watermark in the composite content item comprises:
   for each segment of the composite content item, determining a presence of the first segment watermark in the segment;
   in dependence of the presence of the first segment watermark in the segment:
   detecting the presence of a first segment watermark,
   determining a strength of the first segment watermark,
   if present, inhibiting the embedding of a second segment watermark in the composite content item if the determined strength of the first segment watermark is less than a threshold strength value, and
   logging a combination of the first segment watermark with the second segment watermark in a watermark transaction log.

2. Method according to claim 1, wherein the controlling of the embedding of a second segment watermark in the composite content item comprises replacing the first segment watermark with the second segment watermark.

3. Method according to claim 1, wherein the embedding of the second segment watermark is performed with a second segment watermark payload according to a second segment payload pattern, and wherein the logging of a combination of the first segment watermark with the second segment watermark in a watermark transaction log comprises logging the first segment watermark with the second segment watermark payload according to said second segment payload pattern.

4. Method according to claim 3, wherein each second segment watermark payload comprises a client identifier and a timestamp, which timestamp increases sequentially through the segments of the content item.

5. Method according to claim 4, comprising determining a first segment watermark payload, logging a combination of the first segment watermark payload with the second segment watermark payload.

6. System for distributing a media content item comprising plural segments, comprising:
   an editor unit arranged for concatenating at least one first content item from a first source, each first content item comprising at least one first segment and a second content item from a second source, the second content item comprising at least one second segment, the at least one second segment having a first segment watermark embedded therein, into a composite content item;
   an embedding unit arranged for embedding a second segment watermark in the composite content item,
   output means for sending the watermarked composite content item for distribution;

wherein the embedding unit further comprises:
a determining module for determining for each segment of the composite content item a presence of the first segment watermark in the segment;
a control module arranged for in dependence of the presence of the first segment watermark in the segment controlling the embedding of the second segment watermark in the segment of the composite content item, the controlling of the embedding of a second segment watermark in the composite content item comprising detecting the presence of a first segment watermark and if present, inhibiting the embedding of a second segment watermark in the composite content item if a determined strength of the first segment watermark is less than a threshold strength value; and
the system further comprising
a logging module arranged for logging a combination of the first segment watermark with the second segment watermark in a watermark transaction log.

* * * * *